United States Patent
Smith et al.

(10) Patent No.: US 8,041,215 B2
(45) Date of Patent: Oct. 18, 2011

(54) ONT DISCOVERY IN A DWDM HYBRID PON LT CONFIGURATION

(75) Inventors: Joseph Lee Smith, Fuquay Varina, NC (US); David Eckard, Knightdale, NC (US)

(73) Assignee: Alcatel Lucent, Paris (FR)

( * ) Notice: Subject to any disclaimer, the term of this patent is extended or adjusted under 35 U.S.C. 154(b) by 953 days.

(21) Appl. No.: 11/777,422

(22) Filed: Jul. 13, 2007

(65) Prior Publication Data

US 2009/0016722 A1  Jan. 15, 2009

(51) Int. Cl.
*H04J 14/00* (2006.01)
(52) U.S. Cl. .......... 398/67; 398/68; 398/71; 398/72
(58) Field of Classification Search .......... 398/58, 398/59, 66–68, 70–72
See application file for complete search history.

(56) References Cited

U.S. PATENT DOCUMENTS

| | | | |
|---|---|---|---|
| 6,778,781 B2 * | 8/2004 | Van Eijk et al. | 398/100 |
| 7,298,762 B2 | 11/2007 | Rakib | |
| 7,603,036 B2 * | 10/2009 | Palacharla et al. | 398/72 |
| 2001/0036200 A1 * | 11/2001 | Nelson et al. | 370/503 |
| 2004/0095963 A1 | 5/2004 | Rakib | |
| 2005/0169631 A1 * | 8/2005 | Thinguldstad | 398/58 |
| 2005/0265719 A1 * | 12/2005 | Bernard | 398/58 |
| 2007/0133800 A1 | 6/2007 | Kim | |
| 2008/0292313 A1 * | 11/2008 | Mahony et al. | 398/52 |

FOREIGN PATENT DOCUMENTS

EP  1401234 A  3/2004

OTHER PUBLICATIONS

Mynbaev D K: "Analysis of quality of service provisioning in passive optical networks", Broadband Networks, 2005 2nd International Conference on Boston, MA Oct. 3-7, 2005, Piscataway, NJ, USA, IEEE.

* cited by examiner

*Primary Examiner* — Dalzid Singh
(74) *Attorney, Agent, or Firm* — RG & Associates

(57) ABSTRACT

A method, a computer readable medium, and a system for discovering an Optical Network Terminal (ONT) in a Dense Wave Division Multiplex (DWDM) hybrid Passive Optical Network (PON) Line Terminal (LT), comprises implementing, by an Optical Line Termination (OLT), a ranging procedure on at least one downstream link, wherein the OLT is communicably coupled to the ONT, discovering at least one new ONT, by the OLT, on the at least one downstream link based on the ranging procedure, discovering an unranged ONT, by the OLT, during the ranging procedure, and determining, by the OLT, that the unranged ONT resides on the at least one downstream link.

16 Claims, 6 Drawing Sheets

ONT DISCOVERY IN A DWDM HYBRID PON LT CONFIGURATION

FIELD OF THE INVENTION

The present disclosure is generally related to Passive Optical Networks (PONs) and more particularly to a method, system, and computer readable medium for Optical Network Terminal (ONT) discovery in a Dense Wavelength Division Multiplexing (DWDM) hybrid PON Line Terminal (LT) configuration.

BACKGROUND OF THE INVENTION

In a traditional optical transceiver board, there is a matched set of optical transmitter (TX) and receiver (RX) entities, or ports. While the traditional approach of having a receiver matched with a transmitter is still possible, it is inefficient.

The traditional approach of managing the TX and RX ports would use 4 RX circuits which would then match Media Access Control (MAC) interface electronics. The Media Access Control (MAC) data communication protocol sublayer is the part of the seven-layer OSI model data link layer (layer 2). It provides addressing and channel access control mechanisms that make it possible for several terminals or network nodes to communicate within a multipoint network. The MACs would then be managed for the respective portion of the total upstream traffic from the ONTs on the PON. A passive optical network (PON) is a system that brings optical fiber cabling and signals all or most of the way to the end user. A PON consists of an Optical Line Termination (OLT) at the communication company's office and a number of Optical Network Units (ONUs) near end users. A PON typically consists of an OLT, which resides in a Central Office (CO). The OLT typically services a number of ONUs that are usually connected in a star arrangement using optical splitters, which reside at a premise of a user. PONs are designed on the premise of time-sharing of resources. This traditional solution would require 4 RXs plus potentially 4 MAC electrical interfaces.

Referring to FIG. 1, a traditional system 100 comprises an optical transceiver board 102 with a matched set of optical transmitter (TX) and receiver (RX) ports 106. Each TX/RX port is coupled to a MAC interface 104. A wavelength-division multiplexer (WDM) 108 is coupled to each of the ports 106 to multiplex the optical carrier signal, and to a combiner 110, which is a passive device that combines the optical power carried by many input fibers into a single output fiber. The combiner 110 is coupled to an external PON 112. As previously mentioned, this type of a system is inefficient.

Therefore, what is needed is an ability to overcome these problems and limitations to allow the RX and TX ports to be managed more efficiently.

SUMMARY OF THE INVENTION

DWDM is an optical technology used to increase bandwidth over existing fiber optic backbones. The DWDM hybrid PON approach of the present disclosure is based on the idea that there are "N" downstream transmit signals, or links, (for example, four) but only one upstream receive signal. In short, a Line Terminal (LT) card of the present disclosure would contain four transmitters and one receiver in a common or shared package, along with a single MAC interface chip. A LT card includes a central processor unit (CPU) and random access memory (RAM) for storing a control program in accordance with the type of terminals.

The OLT should understand which of the downstream links each of the ONTs are located on. This location information is required because the OLT must send down information such as OAM messages, bandwidth maps and traffic on the correct downstream link. Several techniques can be implemented as described below.

In another embodiment of the present disclosure, referring to FIG. 2, the use of the four transmitter wavelength combiner 206 and the broadband WDM filter 208 (1490 nm wavelength downstream, 1310 nm wavelength upstream) in the optical transceiver board 202 produces various advantages as described below.

In yet another embodiment of the present disclosure, "N" (for example, four) transmit signals 204 and a common receive signal 210 are utilized as opposed to processing four individual receive signals, with each on 1/"N" of the total upstream traffic, including "N" MAC interfaces. Utilizing the common Planar Lightwave Circuit (PLC) 218 on the optical transceiver board 202 provides optical component integration and large-scale manufacturing advantages including greater heat-dissipation.

In one embodiment of the disclosure, a method for discovering an Optical Network Terminal (ONT) in a Dense Wave Division Multiplex (DWDM) hybrid Passive Optical Network (PON) Line Terminal (LT), comprises implementing, by an Optical Line Termination (OLT), a ranging procedure on at least one downstream link, wherein the OLT is communicably coupled to the ONT, discovering at least one new ONT, by the OLT, on the at least one downstream link based on the ranging procedure, discovering an unranged ONT, by the OLT, during the ranging procedure, and determining, by the OLT, that the unranged ONT resides on the at least one downstream link.

In another embodiment of the disclosure, a computer readable medium comprises instructions for sending, by an Optical Line Termination (OLT), a vendor specific message to an Optical Network Terminal (ONT), wherein the OLT is communicably coupled to the ONT, receiving a response from the ONT that was able to receive the message, and determining a downstream link related to the ONT based on the receiving of the response.

In a further embodiment of the disclosure, a system for discovering an Optical Network Terminal (ONT) in a Dense Wave Division Multiplex (DWDM) hybrid Passive Optical Network (PON) Line Terminal (LT), comprises a memory, and a processor communicably coupled to the memory, wherein the processor sends messages formatted on a certain downstream link from an Optical Line Termination (OLT) to the ONT, receives a response from the ONT based on the messages, wherein the response includes a link field, and discovers the ONT corresponding to the downstream link based on the response.

DETAILED DESCRIPTION OF THE INVENTION

The present disclosure provides several techniques for discovering, by an OLT, which downstream link a particular ONT is located. These techniques include Direct Ranging, OAM Message Utilization, Vendor Specific Message Utilization, and Standard OAM Message Utilization.

Once each ONT has been located on one of the N number of downstream links, all OAM messages and user data traffic are directed to the correct downstream link. In addition, the Advanced Encryption Standard (AES) encryption mechanism must be aware of which downstream path each ONT is located. In cryptography, the AES, also known as Rijndael, is a block cipher adopted as an encryption standard by the U.S. government.

Figure 1:
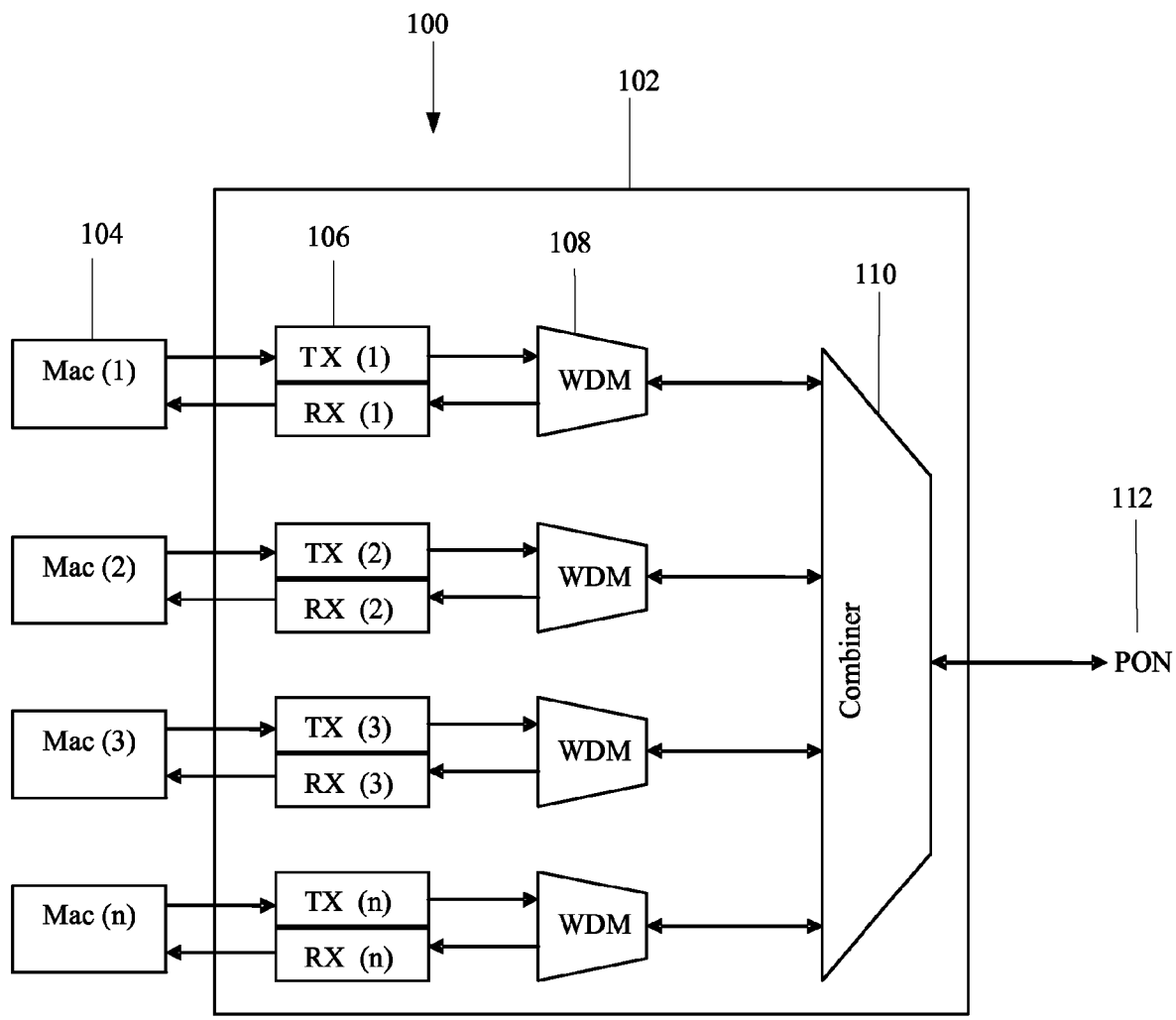
FIG. 1 represents a traditional optical transceiver board.
Figure 2:
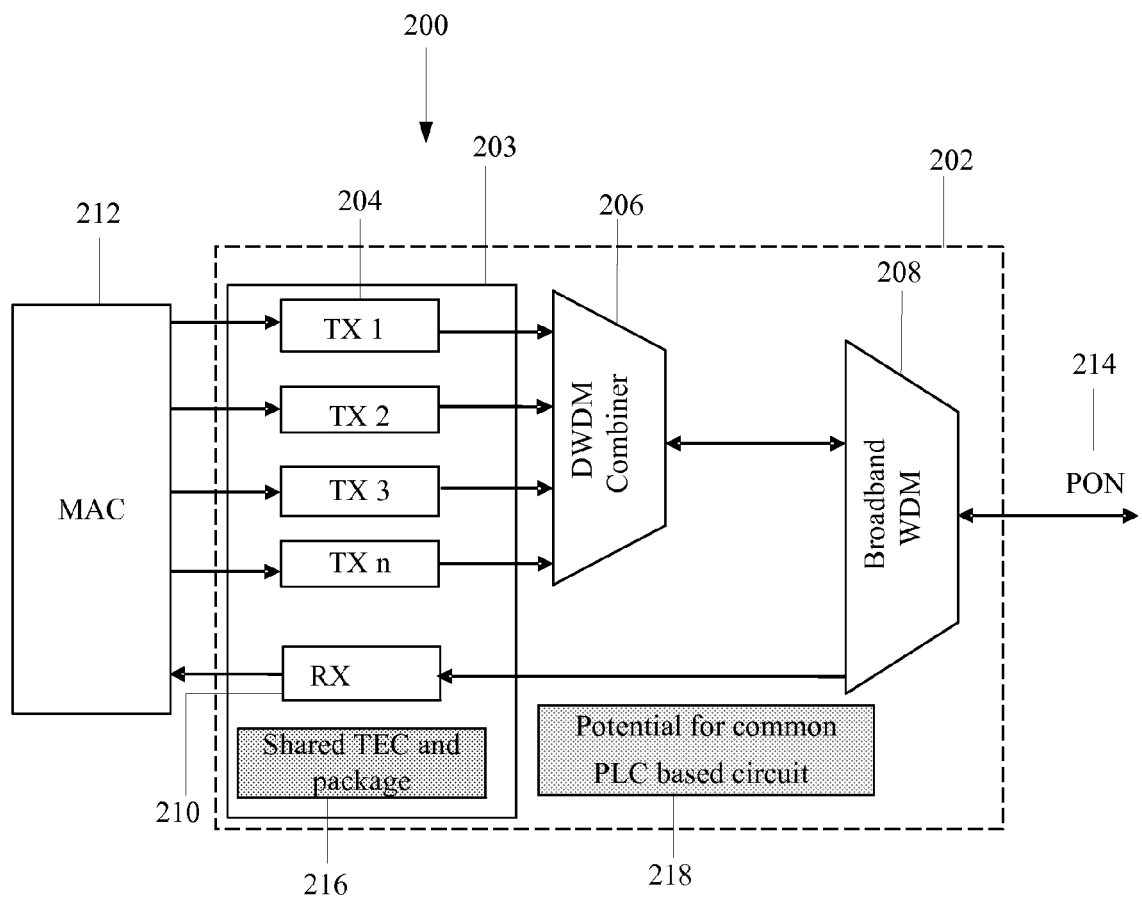
FIG. 2 illustrates an optical transceiver board in accordance with an embodiment of the disclosure.
Figure 3:
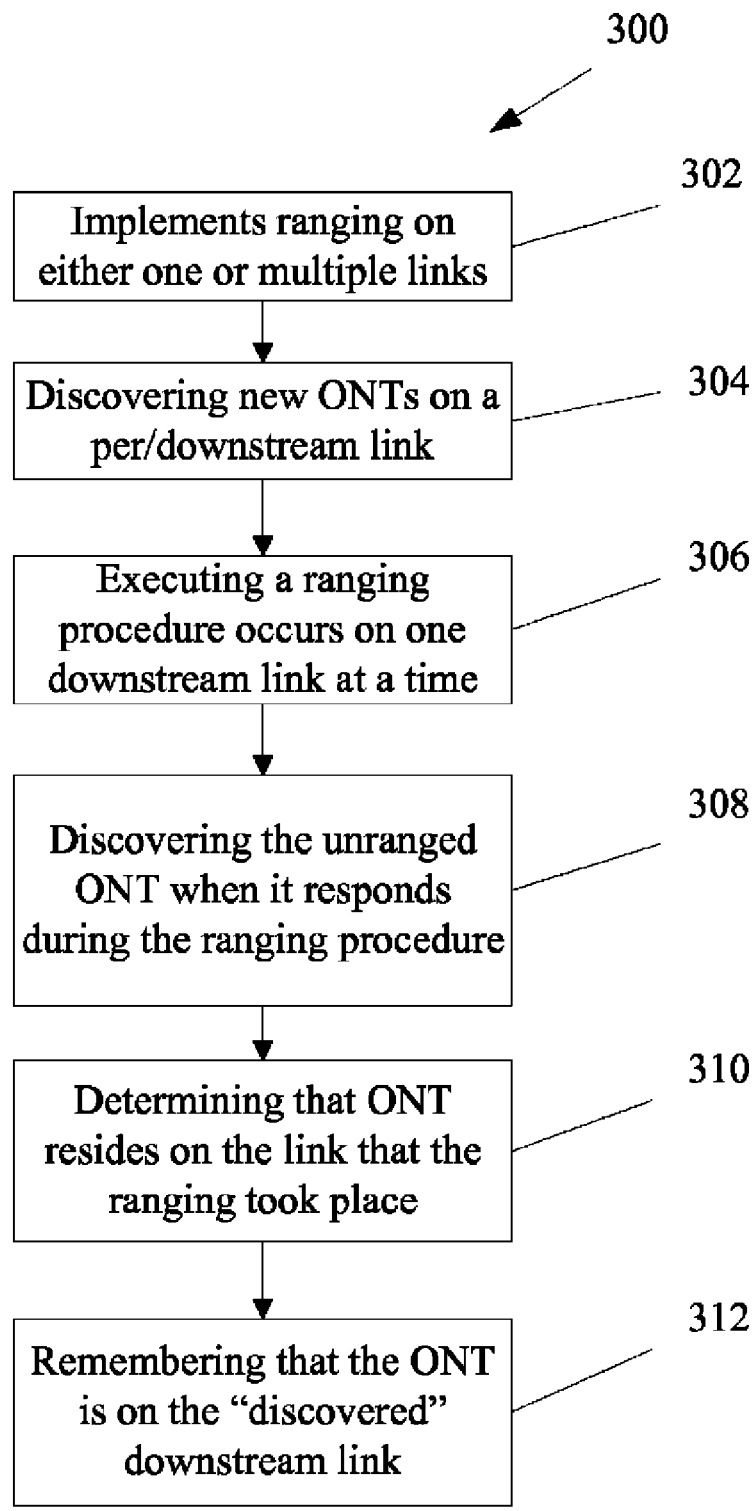
FIG. 3 represents a first flow chart for a method for ONT discovery in a DWDM hybrid PON LT in accordance with an embodiment of the disclosure.

Directed Ranging. Referring now to FIG. 3, a first flow chart 300 for a method for ONT discovery in a DWDM hybrid PON LT is depicted. The method begins at step 302 when the OLT implements ranging on either one downstream link or multiple links sequentially. This allows the OLT to discover new ONTs on a per/downstream link, step 304. A ranging procedure occurs on one downstream link at a time while the other links operate normally in step 306. At step 308, the unranged ONT responds during the ranging procedure and is discovered by the OLT. In step 310, the OLT knew which link the ranging procedure was taking place on and can assume the ONT resides on that downstream link. After the ONT fully ranges and becomes operational, in step 312, the OLT remembers that the ONT is on the "discovered" downstream link. This requires no modification to a standard ONT software stack. These steps are performed by software but may also be performed by hardware, firmware, and/or the combination of software, hardware, and/or firmware without departing from the scope of the present invention.

Figure 4:
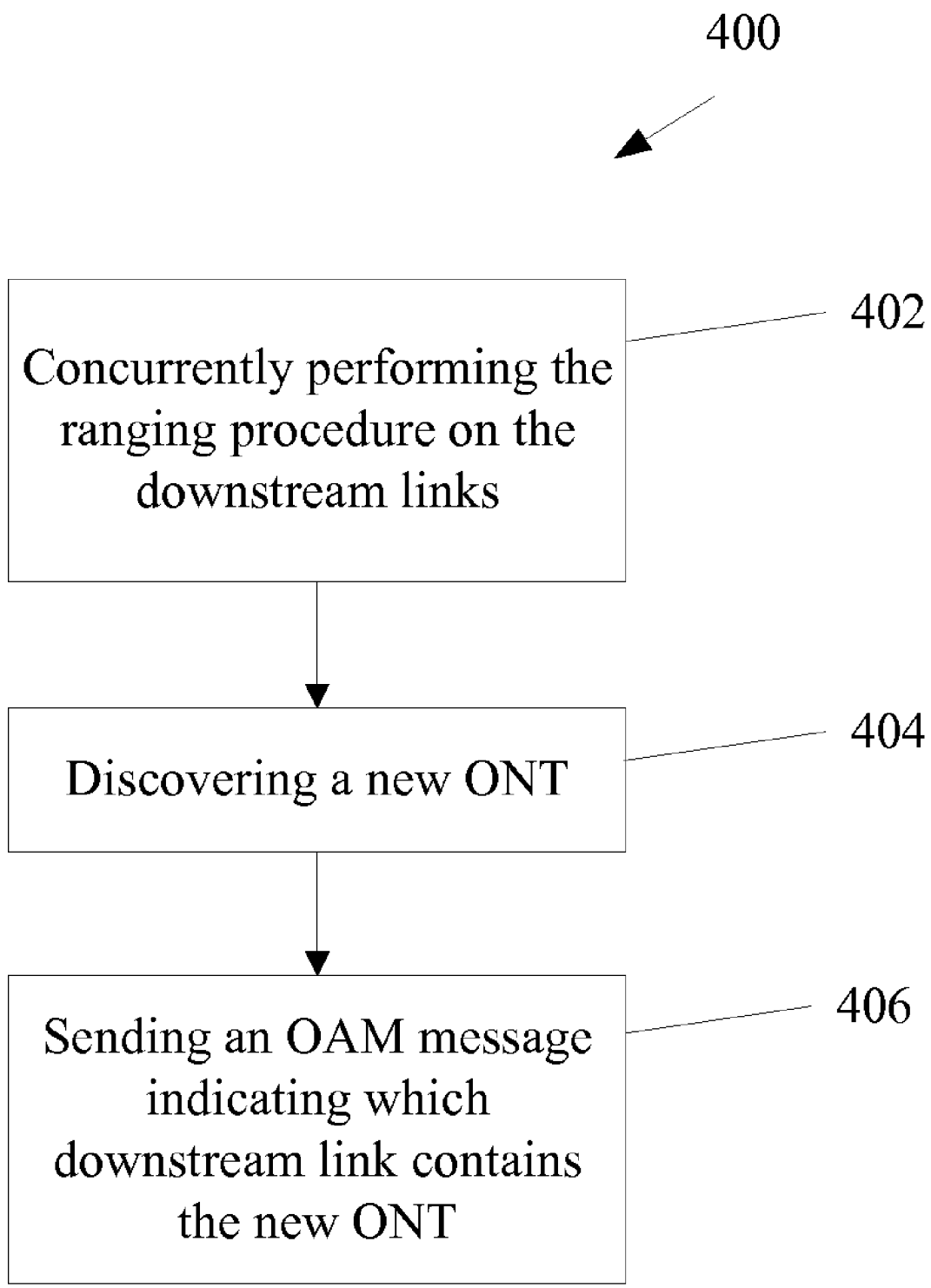
FIG. 4 represents a second flow chart for a method for ONT discovery in a DWDM hybrid PON LT in accordance with an embodiment of the disclosure.

OAM Message Utilization. Referring now to FIG. 4, a second flow chart 400 for a method for ONT discovery in a DWDM hybrid PON LT is depicted. The method begins at step 402 with the OLT running the ranging procedure on one or more of the downstream links concurrently. In step 404, the ONT is discovered. Finally, in step 406, an OAM message is sent indicating which downstream link the ONT is a member of. The message can be vendor specific or a standard OAM message. These steps are performed by software but may also be performed by hardware, firmware, and/or the combination of software, hardware, and/or firmware without departing from the scope of the present invention.

Figure 5:
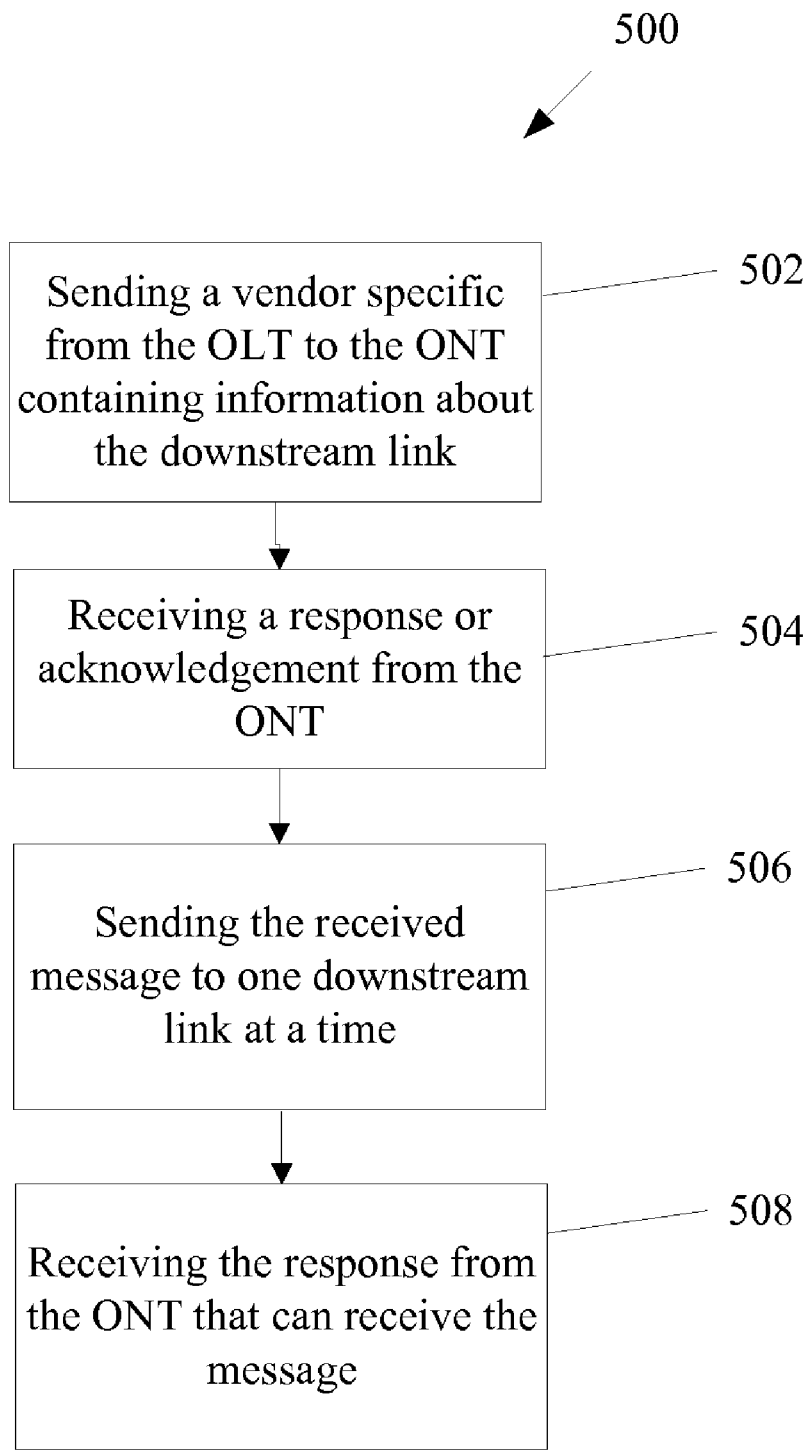
FIG. 5 represents a third flow chart for a computer readable medium for ONT discovery in a DWDM hybrid PON LT in accordance with an embodiment of the disclosure.

Vendor Specific Message Utilization. Referring now to FIG. 5, a third flow chart 500 for a computer readable medium comprising instructions for ONT discovery in a DWDM hybrid PON LT is depicted. The computer readable medium begins at step 502 when a vendor specific message is sent that can be used if the OLT and the ONT can understand the message. The message contains information about the downstream link and the ONT could communicate this back to the OLT in the form of a response or acknowledgement, step 504. In step 506, the OLT sends this message down one downstream link at a time. Finally, in step 508, the ONT responds only if it could receive it. These steps are performed by software but may also be performed by hardware, firmware, and/or the combination of software, hardware, and/or firmware without departing from the scope of the present invention.

Figure 6:
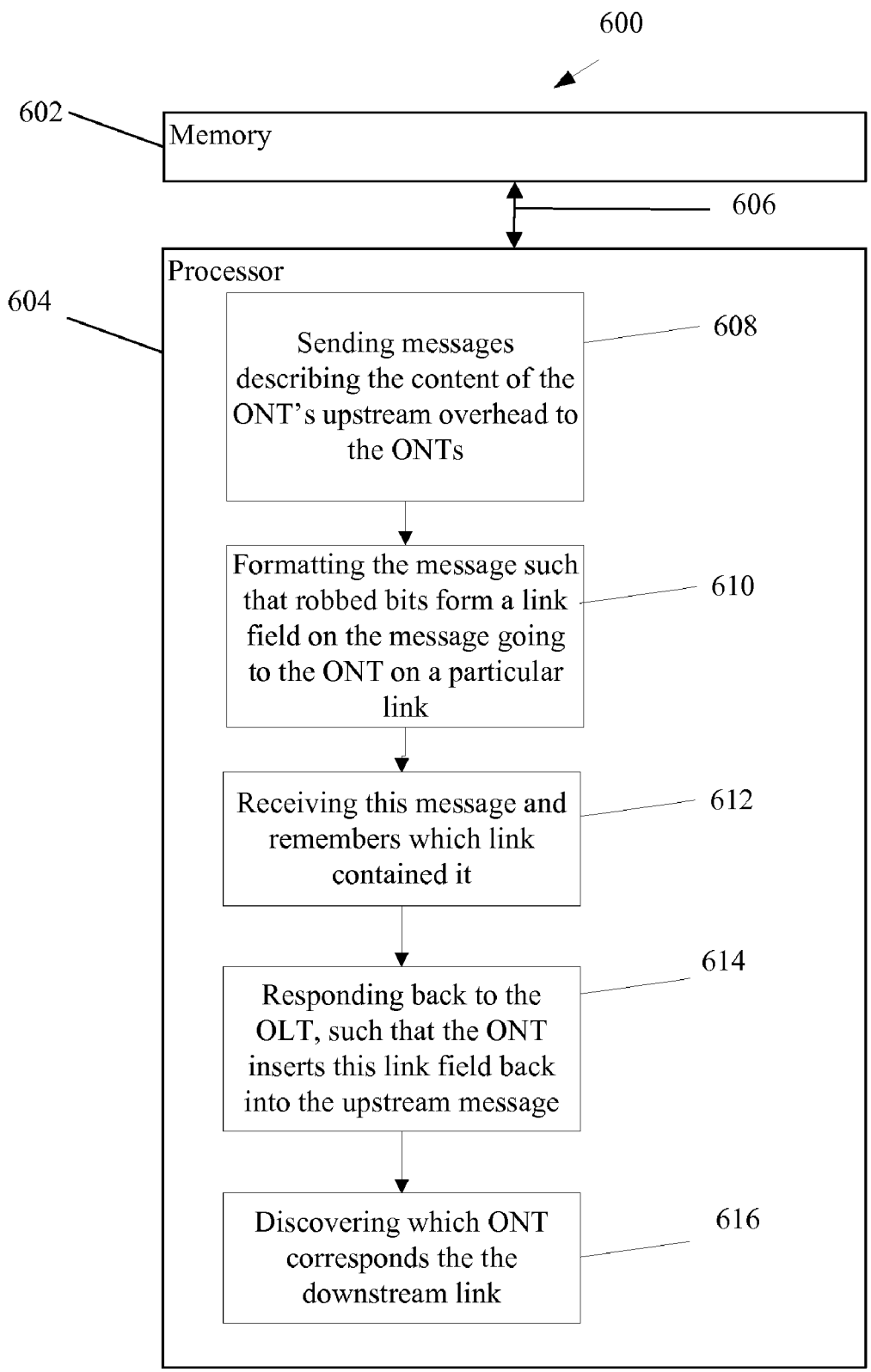
FIG. 6 represents a system for ONT discovery in a DWDM hybrid PON LT in accordance with an embodiment of the disclosure.

Standard OAM Message Utilization. Referring now to FIG. 6, a system 600 for ONT discovery in a DWDM hybrid PON LT is depicted. The system 600 is comprised of a memory 602 communicably coupled 604 to a processor 606. In the processor 606, certain messages are sent down the PON from the OLT to the ONT where one of the messages describes the content of the ONT's upstream overhead (such as the number of preamble bits, delimiter value, etc.) in step 608. In step 610, several bits of these messages are robbed to form a link field that could be manipulated by either software or hardware when the message goes from the OLT to the ONT on a particular link. In step 612, the ONT receives this message and remembers which link that contained it. In step 614, for the response back to the OLT, the ONT inserts this link field back into the upstream message. Finally, in step 616 the OLT discovers which ONT corresponds to the downstream link. These steps are performed by software but may also be performed by hardware, firmware, and/or the combination of software, hardware, and/or firmware without departing from the scope of the present invention.

In one embodiment of the disclosure, a method for discovering an Optical Network Terminal (ONT) in a Dense Wave Division Multiplex (DWDM) hybrid Passive Optical Network (PON) Line Terminal (LT), comprises implementing, by an Optical Line Termination (OLT), a ranging procedure on at least one downstream link, wherein the OLT is communicably coupled to the ONT, discovering at least one new ONT, by the OLT, on the at least one downstream link based on the ranging procedure, discovering an unranged ONT, by the OLT, during the ranging procedure, and determining, by the OLT, that the unranged ONT resides on the at least one downstream link, wherein the ranging procedure on the at least one downstream link occurs sequentially, wherein the ranging procedure occurs on one of the at least one downstream link at a time, wherein while the ranging procedure occurs on the one downstream link at a time, another of the at least one downstream link operates in a normal manner, wherein the unranged ONT is discovered when the unranged ONT responds during the ranging procedure, and wherein the determining that the unranged ONT resides on the at least one downstream link is based on the discovering of the at least one new ONT, based on the ranging procedure. The method also comprises completing, by the OLT, the ranging procedure, wherein after the completing of the ranging procedure, the ONT fully ranges and becomes operational, and comprises verifying, by the OLT, that the unranged ONT resides on the at least one downstream link.

In another embodiment of the disclosure, a computer readable medium comprises instructions for sending, by an Optical Line Termination (OLT), a vendor specific message to an Optical Network Terminal (ONT), wherein the OLT is communicably coupled to the ONT, receiving a response from the ONT that was able to receive the message, and determining a downstream link related to the ONT based on the receiving of the response, wherein the message is understood by at least one of: the OLT, and the ONT, and wherein the message contains information about the downstream link. The computer readable medium further comprises instructions for communicating, by the ONT, information to the OLT in the form of a response or an acknowledgement, wherein the message is sent one downstream link at a time, and wherein the ONT responds to the OLT only if the ONT receives the message.

In a further embodiment of the disclosure, a system for discovering an Optical Network Terminal (ONT) in a Dense Wave Division Multiplex (DWDM) hybrid Passive Optical Network (PON) Line Terminal (LT), comprises a memory, and a processor communicably coupled to the memory, wherein the processor sends messages formatted on a certain downstream link from an Optical Line Termination (OLT) to the ONT, receives a response from the ONT based on the messages, wherein the response includes a link field, and discovers the ONT corresponding to the downstream link based on the response, wherein one of the messages describes the content of the ONT's upstream overhead, wherein at least one bit of the one message is robbed to form the link field, and wherein the ONT receives the one message and remembers which link contained the link field.

Systems, methods, devices and computer readable media have been shown and/or described in the above embodiments for ONT discovery in a DWDM hybrid PON LT configuration. Although the above descriptions set forth preferred embodiments, it will be understood that there is no intent to limit the invention by such disclosure, but rather, it is intended to cover all modifications and alternate implementations falling within the spirit and scope of the invention. Furthermore, the embodiments are intended to cover capabilities and concepts whether they be via a loosely coupled set of components or they be converged into one or more integrated components, devices, circuits, and/or software programs. Still further, communication between the modules or described in the steps herein occurs via at least one of a wireless protocol, a wired protocol and/or a combination of a wireless protocol and a wired protocol.

What is claimed is:

1. A method for discovering an Optical Network Terminal (ONT) in a Dense Wave Division Multiplex (DWDM) hybrid Passive Optical Network (PON) Line Terminal (LT), comprising:
    implementing, by an Optical Line Termination (OLT), a ranging procedure on at least one downstream link;
    discovering at least one new ONT, by the OLT, on the at least one downstream link based on the ranging procedure;
    discovering an unranged ONT by receiving a response from the unranged ONT at the OLT responsive to a message sent to the unranged ONT during the ranging procedure; and
    determining, by the OLT, that the unranged ONT resides on the at least one downstream link.

2. The method of claim 1, wherein the ranging procedure on the at least one downstream link occurs sequentially.

3. The method of claim 2, wherein the ranging procedure occurs on one of the at least one downstream link at a time.

4. The method of claim 3, wherein while the ranging procedure occurs on the one downstream link at a time, another of the at least one downstream link operates in a normal manner.

5. The method of claim 1, wherein the unranged ONT is discovered when the unranged ONT responds during the ranging procedure.

6. The method of claim 1, wherein the determining that the unranged ONT resides on the at least one downstream link is based on the discovering of the at least one new ONT, based on the ranging procedure.

7. The method of claim 1 comprising completing, by the OLT, the ranging procedure.

8. The method of claim 7, wherein after the completing of the ranging procedure, the ONT fully ranges and becomes operational.

9. The method of claim 8 comprising verifying, by the OLT, that the unranged ONT resides on the at least one downstream link.

10. A non-transitory computer readable storage medium comprising instructions, executable by a processor, for:
    implementing, by an Optical Line Termination (OLT), a ranging procedure on at least one downstream link;
    discovering at least one new ONT, by the OLT, on the at least one downstream link based on the ranging procedure;
    discovering an unranged ONT by receiving a response from the unranged ONT at the OLT responsive to a message sent to the unranged ONT during the ranging procedure; and
    determining, by the OLT, that the unranged ONT resides on that least one downstream link.

11. The computer readable medium of claim 10, wherein the message is understood by at least one of: the OLT, and the ONT.

12. The computer readable medium of claim 10, wherein the message contains information about the downstream link.

13. The computer readable medium of claim 10 comprising instructions for communicating, by the ONT, information to the OLT in the form of a response or an acknowledgement.

14. The computer readable medium of claim 10, wherein the message is sent one downstream link at a time.

15. The computer readable medium of claim 10, wherein the ONT responds to the OLT only if the ONT receives the message.

16. A system for discovering a new Optical Network Terminal (ONT) in a Dense Wave Division Multiplex (DWDM) hybrid Passive Optical Network (PON) Line Terminal (LT), comprising:
    a memory; and
    a processor communicably coupled to the memory, wherein the processor:
        implements a ranging procedure on a certain downstream link from an Optical Line Termination (OLT);
        discovers the new ONT, by the OLT, at the downstream link based on the ranging procedure;
        discovers an unranged ONT by receiving a response from the unranged ONT at the OLT responsive to a message sent to the unranged ONT during the ranging procedure; and
        determines, by the OLT, that the unranged ONT resides on the at least one downstream link.

* * * * *